United States Patent
Thibeault et al.

(10) Patent No.: US 10,771,587 B2
(45) Date of Patent: Sep. 8, 2020

(54) SYSTEM AND METHOD FOR RECEIVING AND WRITING INCOMING DATA WRITES BASED ON DATA WRITE LATENCY

(71) Applicant: DATAZOOM, INC.

(72) Inventors: Jason Thibeault, Chandler, AZ (US); Quinn Thibeault, Tempe, AZ (US); Diane Strutner, San Jose, CA (US)

(73) Assignee: DATAZOOM, INC, New York, NY (US)

( * ) Notice: Subject to any disclaimer, the term of this patent is extended or adjusted under 35 U.S.C. 154(b) by 408 days.

(21) Appl. No.: 15/814,860

(22) Filed: Nov. 16, 2017

(65) Prior Publication Data

US 2018/0136854 A1    May 17, 2018

Related U.S. Application Data

(60) Provisional application No. 62/548,192, filed on Aug. 21, 2017, provisional application No. 62/431,011, (Continued)

(51) Int. Cl.
*H04L 29/08*    (2006.01)
*G06F 16/182*    (2019.01)
(Continued)

(52) U.S. Cl.
CPC ............ *H04L 67/32* (2013.01); *G06F 3/0611* (2013.01); *G06F 16/182* (2019.01);
(Continued)

(58) Field of Classification Search
USPC ........................................................ 707/796
See application file for complete search history.

(56) References Cited

U.S. PATENT DOCUMENTS

2002/0049842 A1* 4/2002 Huetsch ................. H04L 29/06
                                                                  709/225
2009/0125796 A1    5/2009 Day et al.
(Continued)

OTHER PUBLICATIONS

U.S. Appl. No. 15/814,848.
(Continued)

*Primary Examiner* — Cam Linh T Nguyen
(74) *Attorney, Agent, or Firm* — DLA Piper LLP (US)

(57) ABSTRACT

A system and method for retrieving and writing data based on data write latency. The system may include a switchboard configured to connect to a beacon integrated into an end user application stored on a computer, a customer configuration database, and one of a plurality of infrastructure pools chosen based on the customer configuration database. The switchboard receives extracted data from the beacon and writes the extracted data to the chosen infrastructure pool. The method may include receiving a connection from a beacon, connecting to and retrieving customer configuration data from a customer configuration database, transpiling a data retrieval code based on the retrieved customer configuration data; transmitting the data retrieval code to the beacon, connecting to one of a plurality of infrastructure pools, receiving extracted data from the beacon and writing the extracted data to the infrastructure pool.

26 Claims, 4 Drawing Sheets

Related U.S. Application Data filed on Dec. 7, 2016, provisional application No. 62/423,525, filed on Nov. 17, 2016.

(51) Int. Cl.
*G06F 16/2457* (2019.01)
*G06F 3/06* (2006.01)
*H04L 29/06* (2006.01)

(52) U.S. Cl.
CPC ...... *G06F 16/1827* (2019.01); *G06F 16/2457* (2019.01); *H04L 67/1004* (2013.01); *H04L 67/1097* (2013.01); *G06F 2212/1016* (2013.01); *H04L 67/02* (2013.01); *H04L 69/16* (2013.01)

(56) References Cited

U.S. PATENT DOCUMENTS

| | | |
|---|---|---|
| 2010/0094988 A1 | 4/2010 | Chang et al. |
| 2010/0103042 A1* | 4/2010 | Bishop ............... G01S 5/0231 455/404.1 |
| 2011/0289268 A1 | 11/2011 | Patel et al. |
| 2012/0180071 A1 | 7/2012 | Lesandro et al. |
| 2012/0230193 A1* | 9/2012 | Fang .................... H04W 12/06 370/235 |
| 2013/0324154 A1* | 12/2013 | Raghupathy ............ G01S 19/10 455/456.1 |
| 2014/0089511 A1* | 3/2014 | McLean ................ G06F 9/5061 709/226 |
| 2014/0337472 A1 | 11/2014 | Newton et al. |
| 2015/0256423 A1 | 9/2015 | Stearns |
| 2015/0256583 A1 | 9/2015 | Rosenzweig et al. |
| 2015/0351008 A1* | 12/2015 | Mayor ................ G06F 16/9537 455/41.2 |
| 2016/0062873 A1 | 3/2016 | Cotugno et al. |
| 2016/0180102 A1* | 6/2016 | Kim .................... G06F 12/1408 713/164 |
| 2016/0269482 A1 | 9/2016 | Jamjoom et al. |
| 2016/0323706 A1* | 11/2016 | Splaine ................ H04W 4/023 |
| 2017/0126818 A1* | 5/2017 | Kang ........................ G01S 1/08 |
| 2017/0243273 A1* | 8/2017 | Ward, Jr. ........... G06Q 30/0623 |
| 2017/0300262 A1* | 10/2017 | Chen ...................... G06F 3/067 |

OTHER PUBLICATIONS

U.S. Appl. No. 15/814,848, filed Nov. 16, 2017, Pending.
International Search Report issued in PCT/US2017/062003 dated Feb. 7, 2018.
Written Opinion issued in PCT/US2017/062003 dated Feb. 7, 2018.
International Search Report issued in PCT/US2017/062004 dated Feb. 8, 2018.
Written Opinion issued in PCT/US2017/062004 dated Feb. 8, 2018.

* cited by examiner

SYSTEM AND METHOD FOR RECEIVING AND WRITING INCOMING DATA WRITES BASED ON DATA WRITE LATENCY

CROSS REFERENCE TO RELATED APPLICATIONS

This application claims priority from U.S. Provisional Application No. 62/423,525, filed Nov. 17, 2016, U.S. Provisional Application No. 62/431,011, filed Dec. 7, 2016, and U.S. Provisional Application No. 62/548,192, filed Aug. 21, 2017, the entirety of each of which is incorporated by reference herein.

DETAILED DESCRIPTION OF THE INVENTION

The present disclosure generally relates to a system and a method for distributing incoming extracted data writes.

Broadly, the system includes a beacon which collects data from a piece of software or hardware, the beacon being installed thereon, a customer configuration database storing customer configuration data, a plurality of infrastructure pools, each of the infrastructure pools being configured to be recognized as to receive extracted data writes based on configuration parameters, one of which being extracted data write latency, and a Switchboard that coordinates interactions between the beacon, customer configuration database, infrastructure pools, and switchboard.

Broadly, the method includes the switchboard retrieving customer configuration from the customer configuration database in response to instantiation of the beacon when the piece of software or hardware upon which the beacon is stored is instantiated. The switchboard compiles a beacon retrieval code from the customer configuration database, and transmits the beacon retrieval code to the beacon which is configured to integrate the beacon retrieval code. The switchboard establishes a connection to an infrastructure pool; the infrastructure pool being chosen from the plurality of infrastructure pools to meet requirements set forth in the retrieved customer configuration data. The switchboard moderates writing of data extracted by the beacon and facilities writing of the extracted data to the chosen infrastructure pool.

By creating such a system and method, it is possible to mediate data writes for data extracted from end user applications by using one of the plurality of infrastructure pools which is tailored to receive writes within given parameters. Writes of extracted data are then directed towards appropriate infrastructure pool to meet the cost and performance needs of a customer needing to extract data from the beacon and store and retrieve the extracted data on a database server. Thus, data extracted at a higher frequency may be directed to an infrastructure pool configured to write data at a faster rate, whereas data extracted at a lower frequency may be diverted to an infrastructure pool unable to write data at a faster rate.

Figure 1:
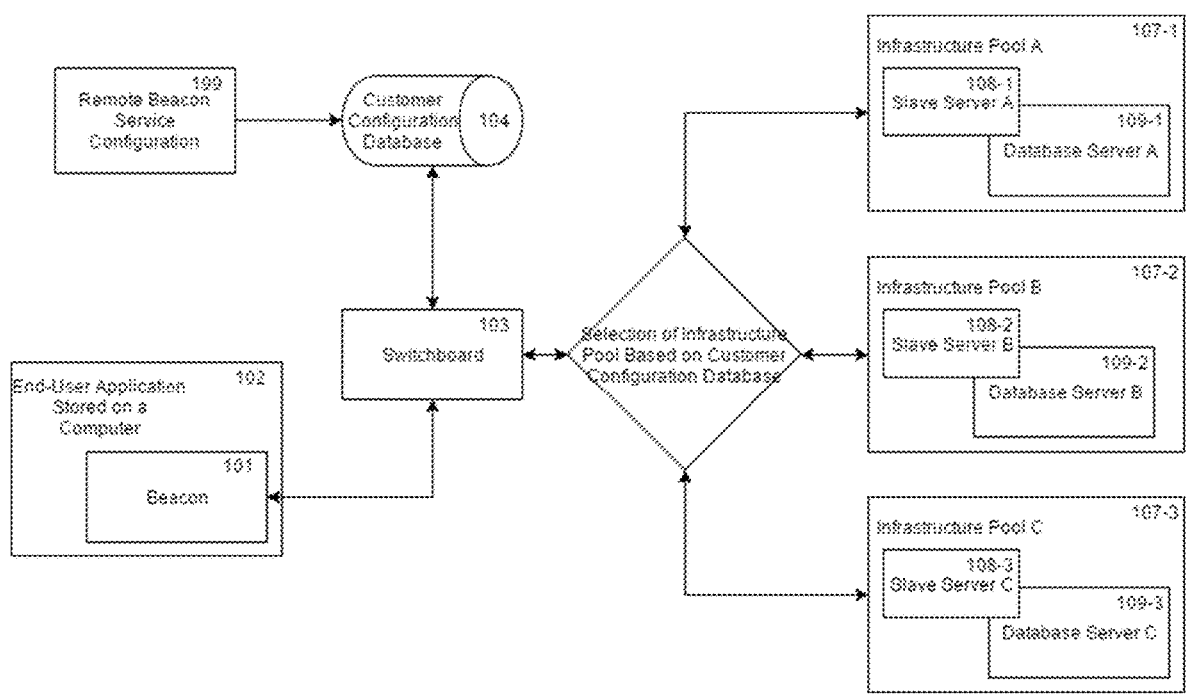
FIG. 1 is a system diagram showing generally a possible arrangement of components for use in a system for receiving and distributing extracted data writes based on extracted data write latency.

FIG. 1 illustrates a general overview of an embodiment of a system for receiving and distributing data writes based on data write latency 100.

Beacon 101 is integrated into an end user application 102 stored on computer, piece of hardware, etc. such as a media player, editing application, etc. The beacon 101 may correspond to a customer, an application, or both. Upon activation of the end user application 102 the beacon 101 reaches out the switchboard 103.

Switchboard 103 may be a computer, piece of hardware, software, virtual machine, networking equipment etc., or plurality or combination thereof.

The switchboard 103 identifies the beacon 101 against a customer configuration database 104. The customer configuration database 104 may contain a list of customers and corresponding customer configuration data (also referred to as the CCD in the drawings), or a list of applications and corresponding application configuration data. The customer configuration data contains at least one parameter related to the retrieval of data from the end user application 102, with at least one parameter being data write latency. The customer configuration data may include, but is not limited to, amongst its possible parameters: latency of data writes, maximum number of beacon connections, maximum number of writes, maximum acceptable size of any write, maximum acceptable size of all writes, maximum throughput, maximum acceptable latency, frequency of data collection from the beacon, frequency of data writes, or maximum acceptable buffer size or any combination thereof. If necessary, a customer may utilize remote beacon Service 199 to adjust the customer configuration data parameter(s) in the customer configuration database 104.

Customer configuration database 104 may also contain specific information about each infrastructure pool in a plurality of infrastructure pools 107. Alternatively, this specific information about each infrastructure pool in the plurality of infrastructure pools 107 may be part of switchboard 103.

Upon identifying corresponding customer configuration data or application configuration data stored in the customer configuration database 104, the switchboard 103 retrieves the customer configuration data. The switchboard 103 transpiles a beacon retrieval code based on the retrieved customer configuration data.

Beacon retrieval code is transmitted to the beacon 101. The beacon integrates the beacon retrieval code, to configure beacon 101 to extract data from the end user application 102.

Switchboard 103 chooses an infrastructure pool 107-1 from the plurality of infrastructure pools 107 based on the customer configuration data 105 and specific information about each infrastructure pool in the plurality of infrastructure pools 107, and connects to the chosen infrastructure pool 107-1.

Each of the infrastructure pools 107 may be a physical computer, piece of hardware, software, virtual machine, networking equipment etc. or plurality or combination thereof. An infrastructure pool 107 may be a general database server configured to receive extracted data writes based on parameter consistent with at least one parameter contained within the customer configuration data.

Alternatively, each of the infrastructure pools 107 may comprise a slave server 108 and a database server 109.

A slave server 108 may be configured to be identified by switchboard 103 when the switchboard is choosing an infrastructure pool from the plurality of infrastructure pools 107. The slave server may be configured to accept incoming extracted data from a beacon 101 or a switchboard 103 and write extracted data to a database server 109. Slave server 108 may be configured to establish a connection between either a beacon 101 or a switchboard 103 and a database server 109. Slave server 108 exists as a physical computer, piece of hardware, software, or virtual machine, etc. or plurality of combination thereof, and one or more of slave servers 108 may exist in a given infrastructure pool 107. Each infrastructure pool 107 may have a different number or no slave servers 108 as compared to another infrastructure pool 107.

A database server 109 in a given infrastructure pool 107 stores incoming extracted data by allowing a beacon 101, switchboard 103, or slave server 108 to write to it, and allows retrieval of extracted data by a user. A database server 109 in a given infrastructure pool 107 exists as a physical computer, piece of hardware, software, or virtual machine, etc. or plurality of combination thereof, and one or more database servers 109 may exist in a given infrastructure pool 107. Each infrastructure pool 107 comprises at least one of a database server 109, and given infrastructure pool may have a different number of database servers 109 than another infrastructure pool in the plurality of infrastructure pools 107.

Alternatively, any given infrastructure pool 107, slave server 108, or database server 109 may be characterized by multiple dimensions as set forth in the customer configuration data.

Beacon 101 may extract data at rates controlled by the customer configuration data. Different infrastructure pools 107 may be able to accept extracted data at different rates. A fast infrastructure pool 107, typically using higher performance components, may be configured to accept extracted data at a high rate. Comparatively, a slower infrastructure pool 107, typically comprising lower cost components, may be configured to accept and be acceptable for data extracted at a lower rate. The rate at which beacon 101 extracts data may be configured by the beacon retrieval code. Switchboard 103 selects an appropriate infrastructure pool 107 based on data extraction rates and the data write rate of a given infrastructure pool 107.

In possible variations on the system set forth in the preceding paragraphs, the following changes may or may not be included and in any combination:

In a first possible variation on the preceding embodiment switchboard 103 may directly connect the beacon 101 to infrastructure pool 107-1, slave server 108-1, or database server 109-1.

In a second possible variation on the preceding embodiment the beacon 101 may be configured to receive customer configuration data 105, transpile customer configuration data 105 into beacon retrieval code, and integrate beacon retrieval code.

In a third possible variation on the preceding embodiment the beacon retrieval code 106 may be configured by a service other than and external to switchboard 103. In this variant embodiment the external beacon retrieval code configuration service is configured to retrieve customer configuration data 105 from customer configuration database 104 based on direction from beacon 101. Alternatively, direction as to which customer configuration data to retrieve may be directed by switchboard 103 or another system configured to identify the identity of beacon 101 and correlate it with its corresponding customer configuration data 105. The external beacon retrieval code configuration service upon receiving customer configuration data 104 will transpile customer configuration data into beacon retrieval code 106. The external beacon retrieval code configuration service will then transmit the beacon retrieval code 106 to switchboard. The external beacon retrieval code configuration service upon receiving customer configuration data 104 will transpile customer configuration data into beacon retrieval code 103. The external beacon retrieval code configuration service may exist as a physical computer, piece of hardware, software, or virtual machine, etc. or plurality of combination thereof.

Figure 2:
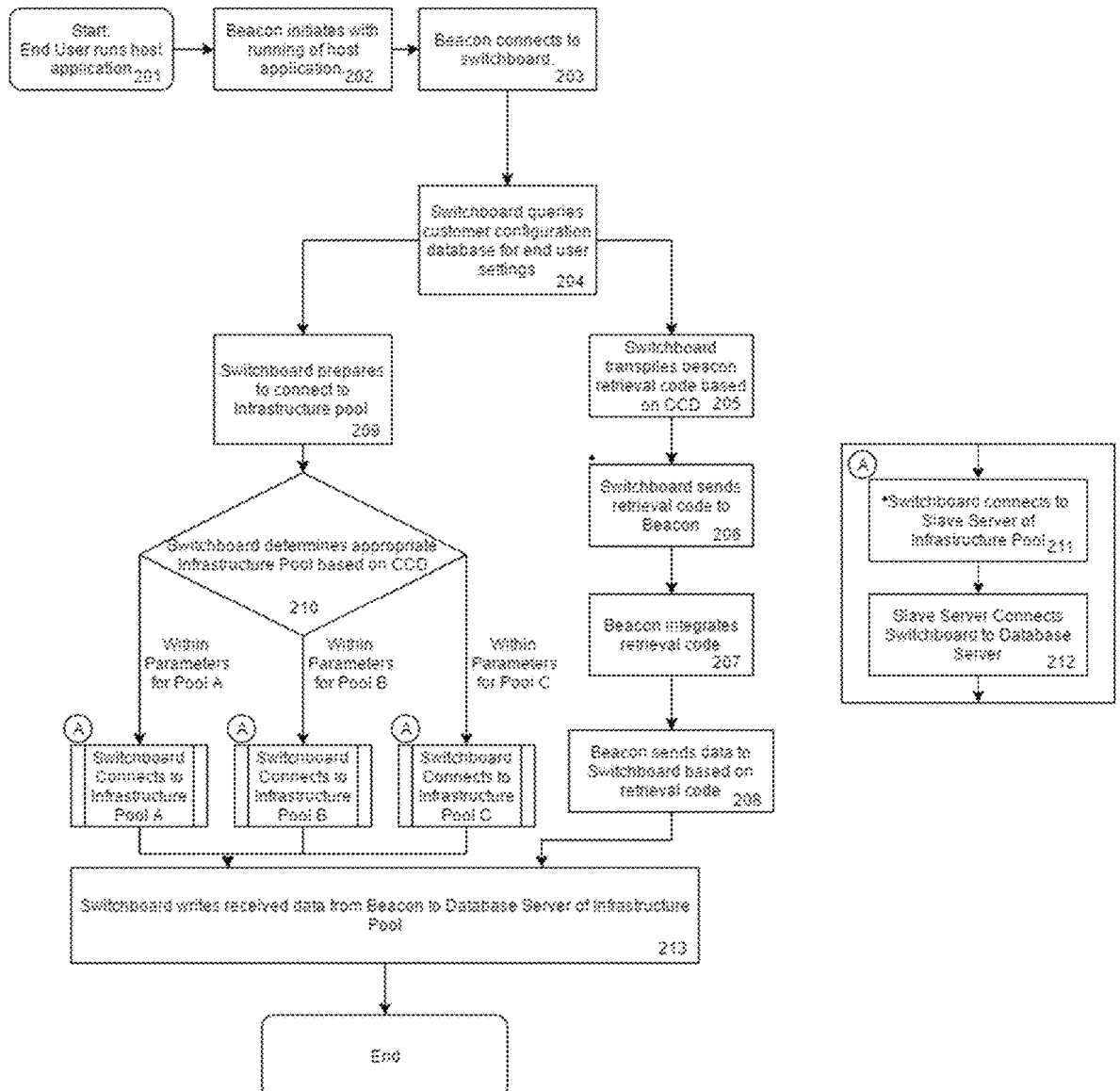
FIG. 2 is a method flowchart showing generally a method for receiving and distributing data writes based on data write latency by extracting data from a beacon, transmitting the extracted data to a switchboard, and having the switchboard write the extracted data to a chosen database server.

FIG. 2 illustrates generally shown an embodiment of a method for receiving and distributing extracted data writes based on data write latency 200.

When an end user instantiates an application 201 having an integrated beacon 101, the beacon 101 is activated 202 causing beacon 101 to establish a connection 203 to switchboard 103.

Switchboard 103 queries 204 customer configuration database 104 for customer configuration data. Switchboard 103 retrieves 204 the corresponding customer configuration.

Switchboard 103 transpiles 205 a beacon retrieval code based on the customer configuration data. Switchboard 103 transmits 206 the beacon retrieval code to beacon 101. Beacon 101 integrates 207 the beacon retrieval code in anticipation of extracting and transmitting extracted data to be ultimately written to a database server 109, the retrieval code informing the beacon as to the parameters of data to be extracted, such as but not limited to data type, retrieval interval, etc.

Before, during, or after preceding steps 205 through 207 switchboard queries 209 the plurality of infrastructure pools 107 to identify from the plurality of infrastructure pools 107 an infrastructure Pool 107-1 which is configured to receive extracted data consistent with the parameters set forth in customer configuration data.

Upon locating an infrastructure pool 107-1 consistent with the parameters set forth in the customer configuration data, switchboard 103 connects 210 to the infrastructure pool 107-1. Switchboard 103 connects 211 to slave server 108-1 of the infrastructure pool 107-1, and the slave server 108-1 connects 212 the switchboard 103 to the database server of infrastructure pool 109-1.

Beacon 101 extracts 208 data from end user application 102 based on the beacon retrieval code 106 and transmits the extracted data to the switchboard 103.

Switchboard 103 writes 213 the extracted data received from beacon 101 in step 208 to database server 109-1 of infrastructure pool 107-1 the switchboard 103 connected to in step 210. The extraction 208 and write events 213 may occur a single time, or may continue and occur multiple times over the course of operation of end user application 102.

In first possible variation on the preceding embodiment an external beacon retrieval code configuration service may transpile a beacon retrieval code based on customer configuration data 205. The external beacon retrieval code configuration service may then transmit the beacon retrieval code to Switchboard 103. Switchboard 103 transmits 206 the beacon retrieval code 106 to beacon 101. Alternatively, the external beacon retrieval code configuration service may directly transmit beacon retrieval code 106 directly to beacon 101.

Figure 3:
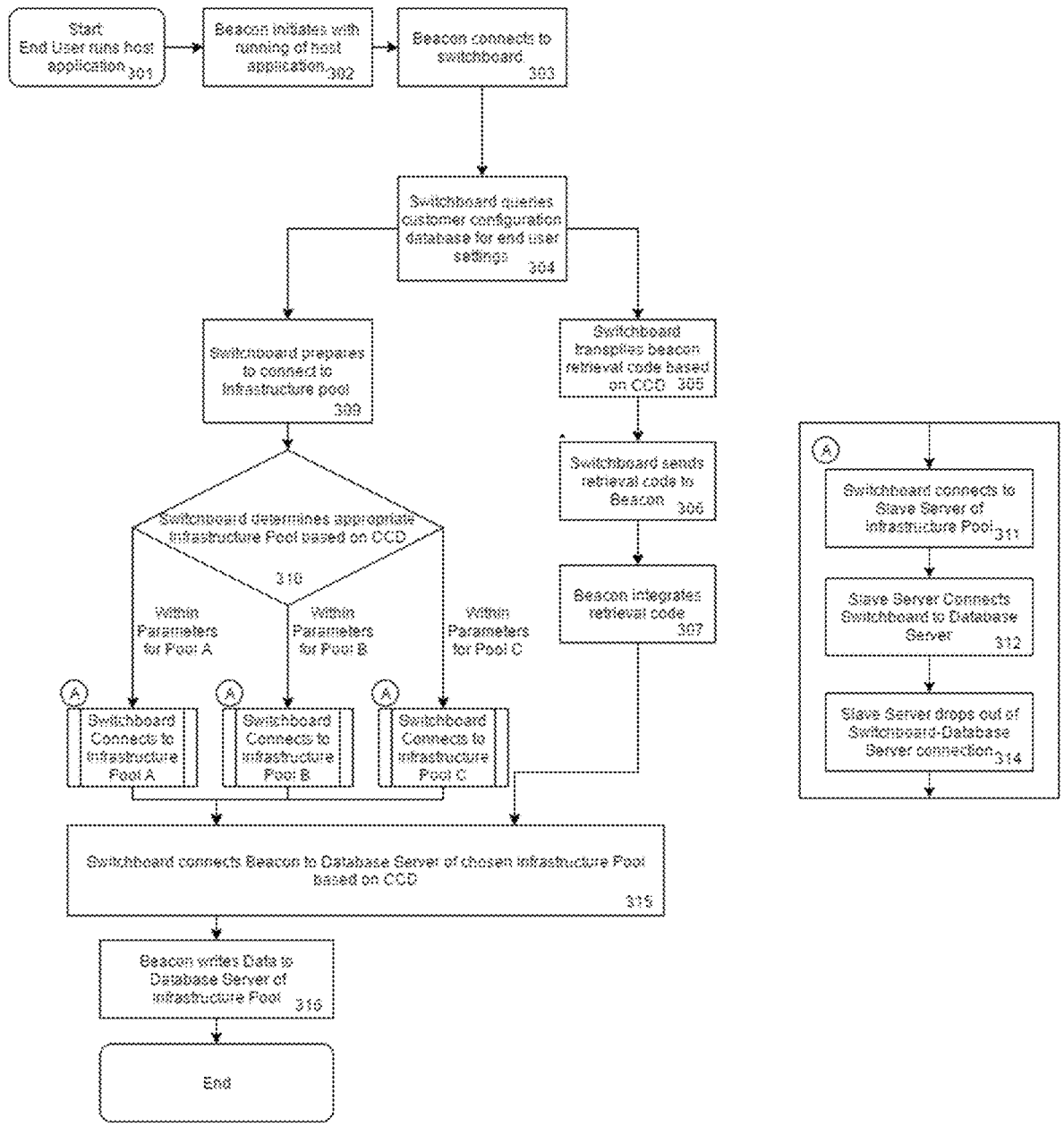
FIG. 3 is a method flowchart showing generally a method for receiving and distributing data writes based on data write latency by extracting data and having a beacon write the extracted data to a database server, the switchboard connecting the beacon to the chosen database pool.

FIG. 3 illustrates a general overview of a second embodiment of a method for receiving and distributing extracted data writes based on data write latency 300.

Steps 301 through 307 and 309 through 312 generally parallel the steps as outlined in FIG. 2 of the Drawings.

After switchboard 103 is connects 312 to the chosen infrastructure database server 109-1 slaver server 108-1 terminates 314 its connection to switchboard 103 while the connection between switchboard 103 and database server 109-1 of infrastructure pool 107-1 is maintained. Step 314 is possible in the embodiment shown in FIG. 2 after step 312 and is not necessary for performing the method embodied in either FIG. 2 or FIG. 3.

Switchboard 103 connects 315 beacon 101 to database server 109-1 of chosen infrastructure Pool 107-1. Beacon 101 extracts 316 data from end user application 102 based on the beacon retrieval code and writes 316 the extracted data directly to the database Server 109-1 of the chosen infrastructure Pool 107-1. Extraction and write events 316 may occur a single time, or may continue and occur multiple times over the course of operation of end user application 102.

Figure 4:
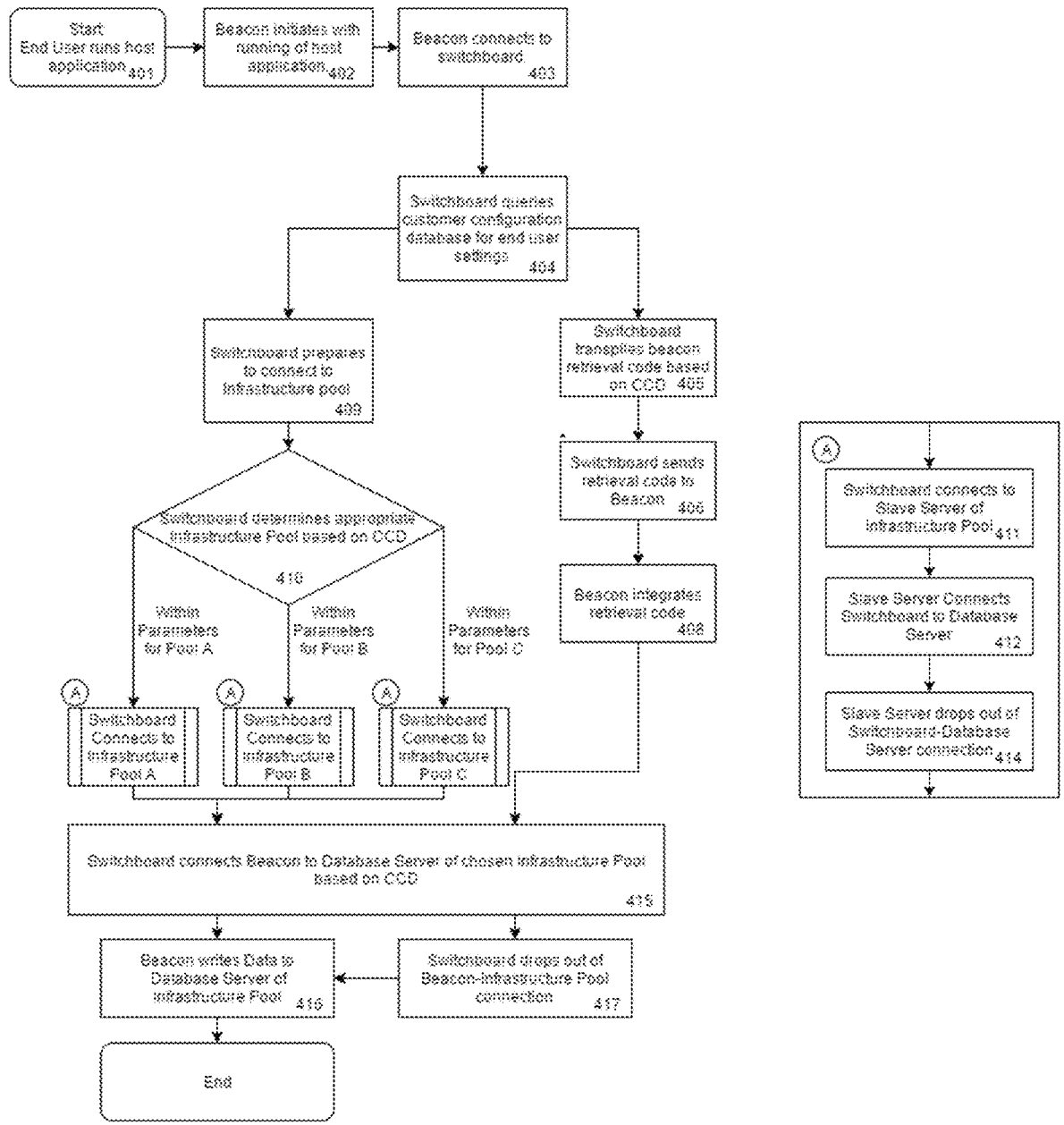
FIG. 4 is a method flowchart showing generally a method for receiving and distributing data writes based on data write latency by extracting data and having a beacon write the extracted data to a database server, the switchboard connecting the beacon to the chosen database pool and terminating the connection between the switchboard and the beacon while maintaining the connection between the beacon and the infrastructure pool.

FIG. 4 illustrates a general overview of a third embodiment of a method for receiving and distributing extracted data writes based on data write latency 400.

Steps 401 through 407, 409 through 412, and 414 through 416 generally parallel the steps as outlined in FIG. 2 of the Drawings.

After beacon 101 is connected 415 to chosen infrastructure database server 109-1 switchboard 103 terminates 417 its connection to beacon 101, chosen infrastructure pool 107-1, slaver server 108-1, database server 109-1, or any or all of said elements to which the beacon 101 is connected to while the connection between beacon 101 and database server 109-1 of chosen infrastructure pool 107-1 is maintained. This step is a possible variation on the embodiment shown in FIG. 3 after step 315 and is not necessary for carrying the method embodied in FIG. 3.

Thus, an embodiment of a system for receiving and distributing data writes based on data write latency and several variations thereof have been described. Several embodiments for method of receiving and distributing data writes based on data write latency and variations thereof have been provided. It is understood that the embodiments and variations thereof disclosed herein may be understood by a person of ordinary skill in the art to allow practice of the invention in way other than the embodiments and variations disclosed herein, and that the examples provided are not for the purposes of limitation.

The invention claimed is:

1. A system for retrieving and writing data based on data write latency comprising:
a switchboard configured to:
connect to a beacon integrated into an end user application executed on a computer;
connect to a customer configuration database to retrieve customer configuration data;
connect to one of a plurality of infrastructure pools, the infrastructure pool comprising at least one server and being chosen based on the retrieved customer configuration data from the customer configuration database;
transpile a beacon retrieval code based on the retrieved customer configuration data, wherein the beacon integrates the beacon retrieval code to extract data from the end user application; and
receive the extracted data from the beacon and write the extracted data to the chosen infrastructure pool.

2. The system for retrieving and writing data based on data write latency in claim 1, wherein the chosen infrastructure pool further comprises: a slave server and a database server.

3. The system for retrieving and writing data based on data write latency in claim 1, wherein the customer configuration data includes at least a data write latency parameter for a retrieval of data from the end user application.

4. The system for retrieving and writing data based on data write latency in claim 2, wherein the switchboard is further configured to connect to the database server of the chosen infrastructure pool.

5. The system for retrieving and writing data based on data write latency in claim 2, wherein the switchboard is further configured to write the received extracted data from the beacon to the database server of the chosen infrastructure pool.

6. The system for retrieving and writing data based on data write latency in claim 1, wherein the switchboard is further configured to transmit the beacon retrieval code to the beacon.

7. The system for retrieving and writing data based on data write latency in claim 1, wherein the switchboard is further configured to:
write the extracted data retrieved by the beacon to the chosen infrastructure pool at a first rate based on a data write rate that the chosen infrastructure pool has, wherein the extracted data is extracted by the beacon at a second rate controlled by the customer configuration data.

8. The system for retrieving and writing data based on data write latency in claim 1, wherein the switchboard receives extracted data writes from the beacon in response to events.

9. The system for retrieving and writing data based on data write latency in claim 1, wherein the switchboard receives extracted data writes from the beacon in response to events dictated by the beacon retrieval code.

10. The system for retrieving and writing data based on data write latency in claim 7, wherein the switchboard receives extracted data writes from the beacon periodically.

11. The system for retrieving and writing data based on data write latency in claim 10, wherein the switchboard receives extracted data writes from the beacon periodically as dictated by the beacon retrieval code.

12. The system for retrieving and writing data based on data write latency in claim 1, wherein the switchboard is further configured to receive a beacon retrieval code based on the retrieved customer configuration data transpiled by an external beacon retrieval code service.

13. A method for retrieving and writing data based on data write latency comprising:
a switchboard receiving a connection from a beacon integrated into an end-user application executed on a computer;
retrieving customer configuration data from a customer configuration database, wherein the costumer configuration data includes at least a data write latency parameter for a retrieval of data from the end user application;

transpiling a beacon retrieval code based on the retrieved customer configuration data;
transmitting the beacon retrieval code to the beacon, wherein the beacon integrates the beacon retrieval code to extract data from the end user application;
the switchboard connecting to one of a plurality of infrastructure pools, the infrastructure pool comprising at least one server and being chosen based on the customer configuration data;
the switchboard receiving extracted data from the beacon based on the beacon retrieval code; and
the switchboard writing the extracted data from the beacon to the chosen infrastructure pool.

14. The method for retrieving and writing data based on data write latency in claim 13, wherein the switchboard connecting to one of the plurality of infrastructure pools is chosen based on the data write latency parameter.

15. The method for retrieving and writing data based on data write latency in claim 13, wherein the infrastructure pool the switchboard connects to comprises a slave server and a database server; and the switchboard writes the extracted data from the beacon to the database server.

16. The method for retrieving and writing data based on data write latency in claim 13, wherein the writing includes the beacon writing to a slave server in the chosen infrastructure pool which writes to a database server in the chosen infrastructure pool.

17. The method for retrieving and writing data based on data write latency in claim 13, wherein the switchboard receives data from the beacon at periodic intervals.

18. The method for retrieving and writing data based on data write latency in claim 13, wherein the switchboard receives data from the beacon at predefined events.

19. The method of claim 13, wherein the switchboard performs the retrieving, transpiling, and transmitting.

20. A method for retrieving and writing data based on data write latency comprising:
a switchboard receiving a connection from a beacon integrated into an end-user application executed on a computer;
retrieving customer configuration data from a customer configuration database, wherein the costumer configuration data includes at least a data write latency parameter;
the switchboard connecting to one of a plurality of infrastructure pools, the infrastructure pool comprising at least one server and being chosen based on the customer configuration data;
the switchboard transpiling a beacon retrieval code based on the retrieved customer configuration data, wherein the beacon integrates the beacon retrieval code to extract data from the end user application;
the switchboard connecting the beacon to the chosen infrastructure pool; and
enabling the beacon to write the extracted data from the beacon based on the beacon retrieval code to the chosen infrastructure pool.

21. The method for retrieving and writing data based on data write latency in claim 20, wherein in the switchboard connecting the beacon to the chosen infrastructure pool the switchboard further connects the beacon to database server comprising the chosen infrastructure pool enabling the beacon to write extracted data to the database server.

22. The method for retrieving and writing data based on data write latency in claim 20, wherein the switchboard connecting the beacon to the chosen infrastructure pool enables the beacon to write extracted data from the beacon based on the beacon retrieval code to the infrastructure pool at predefined events based on the beacon retrieval code.

23. The method for retrieving and writing data based on data write latency in claim 20, wherein the switchboard connecting the beacon to the chosen infrastructure pool enables the beacon to write extracted data from the beacon based on the beacon retrieval code to the infrastructure pool at periodic intervals.

24. The method for retrieving and writing data based on data write latency in claim 20, further comprising:
the switchboard transmitting the beacon retrieval code to the beacon.

25. The method for retrieving and writing data based on data write latency in claim 20, further comprising:
the switchboard transmitting the retrieved customer configuration data to an external beacon retrieval code configuration service;
the external retrieval code configuration service transpiling a beacon retrieval code based on the customer configuration data; and,
the external retrieval code configuration service transmitting the beacon retrieval code to the beacon, the beacon being configured to integrate the data retrieval code.

26. The method of claim 20, wherein the switchboard performs retrieving.

* * * * *